Jan. 31, 1967 A. P. COX, JR., ETAL 3,302,185

FLEXIBLE LOGIC CIRCUITS FOR BUFFER MEMORY

Filed Jan. 20, 1964 6 Sheets-Sheet 1

INVENTORS
ANDREW P. COX, JR.
ROBERT H. SAPP
BY JOSEPH (NMI) ABRUZZO

ATTORNEYS

FLEXIBLE LOGIC CIRCUITS FOR BUFFER MEMORY

Filed Jan. 20, 1964 6 Sheets-Sheet

INVENTORS
ANDREW P. COX, JR.
ROBERT H. SAPP
BY JOSEPH (NMI) ABRUZZO
ATTORNEYS

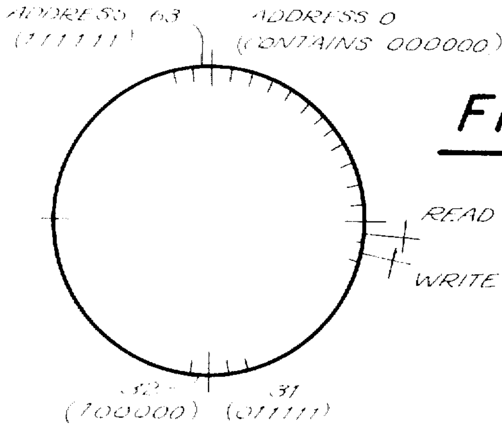
FIG. 2
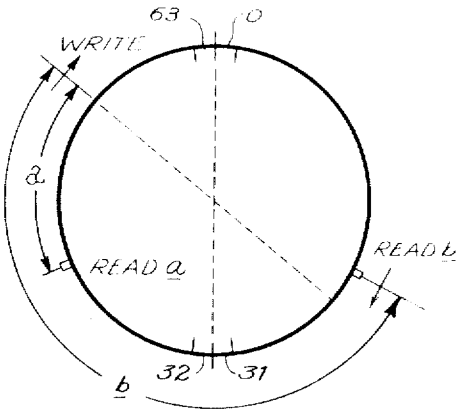
FIG. 3
| DECIMAL ADDRESS | BINARY 5 | 4 | 3 | 2 | 1 | 0 (LEAST SIGNIFICANT) |
|---|---|---|---|---|---|---|
| 0 | 0 | 0 | 0 | 0 | 0 | 0 |
| 1 | 0 | 0 | 0 | 0 | 0 | 1 |
| 2 | 0 | 0 | 0 | 0 | 1 | 0 |
| ⋮ | | | | | | |
| 16 | 0 | 1 | 0 | 0 | 0 | 0 |
| 17 | 0 | 1 | 0 | 0 | 0 | 1 |
| ⋮ | | | | | | |
| 31 | 0 | 1 | 1 | 1 | 1 | 1 |
| 32 | 1 | 0 | 0 | 0 | 0 | 0 |
| ⋮ | | | | | | |
| 62 | 1 | 1 | 1 | 1 | 1 | 0 |
| 63 | 1 | 1 | 1 | 1 | 1 | 1 |
FIG. 4
INVENTORS
ANDREW P. COX, JR.
ROBERT H. SAPP
BY JOSEPH (NMI) ABRUZZO
ATTORNEYS

INVENTORS
ANDREW P. COX, JR.
ROBERT H. SAPP
BY JOSEPH (NMI) ABRUZZI
ATTORNEYS

Jan. 31, 1967 A. P. COX, JR., ETAL 3,302,185

FLEXIBLE LOGIC CIRCUITS FOR BUFFER MEMORY

Filed Jan. 20, 1964 6 Sheets-Sheet 5

INVENTORS
ANDREW P. COX, JR.
ROBERT H. SAPP
BY JOSEPH (NMI) ABRUZZO

ATTORNEYS

INVENTORS
ANDREW P. COX, JR
ROBERT H. SAPP
BY JOSEPH (NMI) ABRUZZI
ATTORNEYS

United States Patent Office 3,302,185
Patented Jan. 31, 1967

3,302,185
FLEXIBLE LOGIC CIRCUITS FOR BUFFER MEMORY

Andrew P. Cox, Jr., Lutherville, Robert H. Sapp, Baltimore, and Joseph Abruzzo, Severna Park, Md., assignors, by mesne assignments, to the United States of America as represented by the Secretary of the Navy Filed Jan. 20, 1964, Ser. No. 339,042
8 Claims. (Cl. 340—172.5)

This invention relates to storage or memory systems for digital computers and is particularly directed to the combination of a buffer or temporary storage connected between a source of random digital information and a clock-operated permanent storage.

Where a high speed digital computer must receive and process large quantities of information, the portions of the equipment, called memory or store for holding the information before, during and after the various logical arithmetic operations, is relatively expensive. The problem of memory design is aggravated when the raw information to be fed into the computer memory is random in occurrence. In sonar systems, for example, the receipt of sonar signals, called "events" is particularly erratic, the density or frequency of received signals varying widely in spite of elaborate threshold or sensitivity controls for the receiver. When these signals are received and detected they must be converted to binary digits before they can be introduced to the computer.

In any system where asynchronous information must be fed into a synchronous system, temporary or buffer storage must be employed. Where the rate of receipt of the asynchronous raw information may be momentarily higher than the consumption rate of the computer, buffer storage must be of sufficient capacity to prevent the loss of incoming information.

An object of this invention is to provide a novel combination of permanent or computer memory and buffer memory for minimizing loss of incoming information.

It will be recognized that the rate of incoming random information may vary not only above but below the consumption rate of the computer and it is apparent that much may be done on the problem of leveling the load of the buffer.

It is, accordingly, a further object of this invention to provide an efficient logical circuit for transferring information from the buffer to the permanent storage.

As part of one sonar system known as SPADE, equipment is necessary to transfer information from a sonar signal processor (SSP) to the computer memory. There are, of course, certain ground rules that exist such as timing of control line signals, definite code words, and the like. Within such limitations, a design is made, according to this invention, that provides for the transfer of random information from the SSP to the computer memory, and serves not only to use the computer in its most efficient manner, but makes the greatest use of the buffer memory and holds the memory size to a minimum. An additional advantage to the design of this invention is the fact the equipment disclosed here is equally adaptable to computers of all types.

The objects of this invention are attained in a system comprising a buffer memory for a finite number of digital words which completely define a received signal. A sonar signal, for example, may contain information including range, range rate, azimuth, amplitude, et cetera. This information must be demodulated, converted to binary digits, encoded, and then passed to a buffer memory. The memory has write address circuitry for feeding the digitalized words into the buffer memory and read address circuitry for reading them out to the computer memory. The circuits to be described below include the logic for generating a signal, called the buffer full signal (BFS), to show that the buffer is full and that more words cannot be written into the buffer. Additionally, a signal is generated to indicate that the buffer is full enough (BFE) to enable the transfer of information from the buffer to the computer memory. Transfer may be done on a word by word basis or on a block basis.

Other objects and features of this invention will become apparent to those skilled in the art by referring to the specific embodiments described in the following specification and shown in the accompanying drawing in which:

FIGS. 2 and 3 show geometric figures for explaining the address system of the buffer storage;

FIG. 4 shows a decimal to binary conversion table employed in the logic circuits of FIG. 1;

Figure 1:
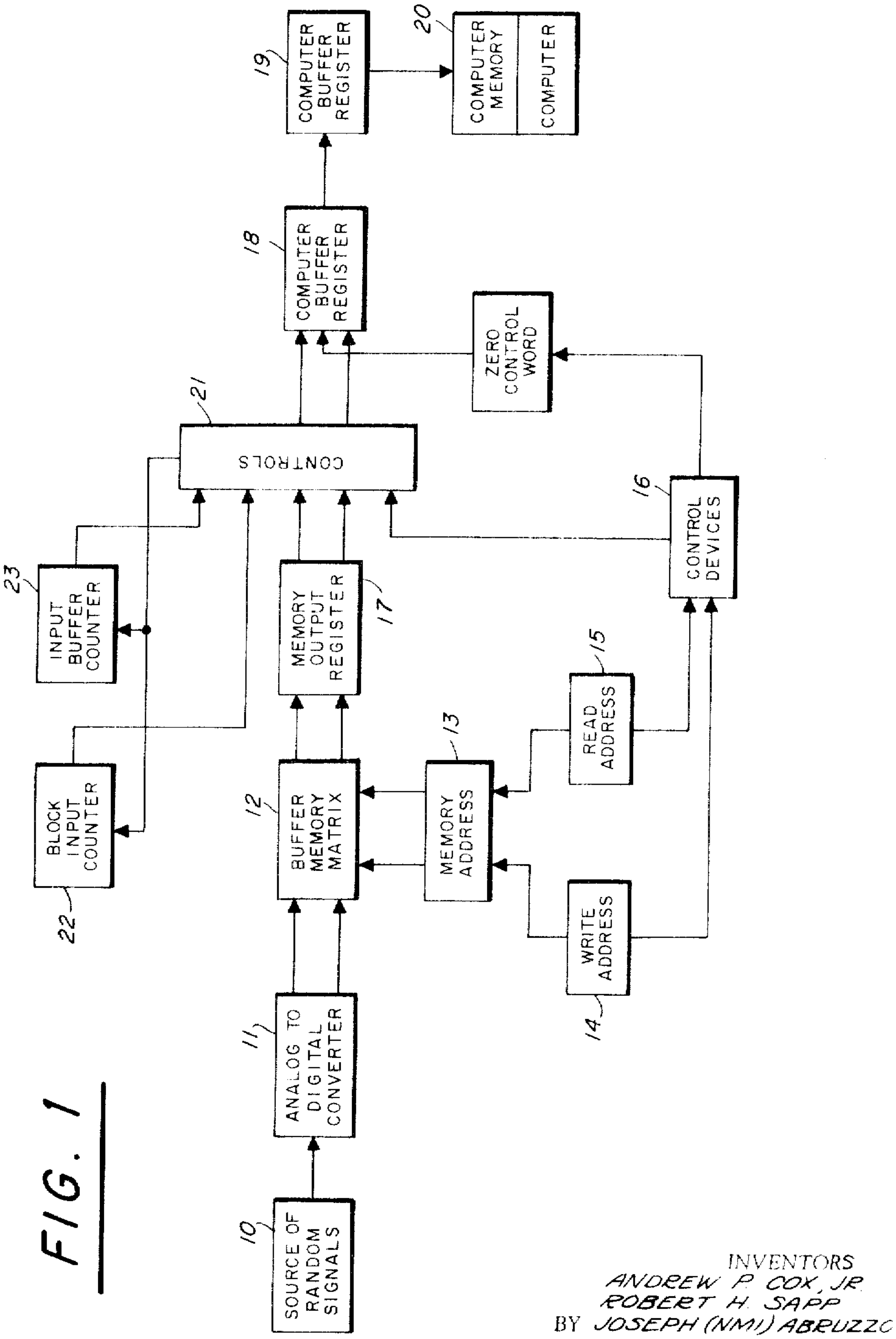
FIG. 1 is a block diagram of the system showing the flow of control signals throughout the buffer controls system.

In FIG. 1, at 10 is indicated a source of random signals. It is contemplated that from this source may be obtained any raw information of the type which can be processed in a digital computer. Sonar signals are one example of pulse signals which are completely erratic, unpredictable, and variable widely in signal amplitude and density. At 11 is shown an analog-to-digital converter for digitalizing the individual signal pulses from the source. In sonar systems, it is found that each event or each raw signal pulse may be completely defined, for the purposes of the sonar system, by a binary word consisting of, say 30 bits. At 12 is shown the buffer memory for storing a predetermined number of words from the converter 11. In one buffer memory the number of slots or addresses into which words could be inserted were 64 in number. Conventional write address logic circuitry 14 and read address logic circuitry 15 of the memory system 13 is contemplated. Control circuits 16 route the words into slots in the memory and enable read out of the words from the slots in the usual manner. During readout the words move, one at a time, from the memory output register 17 through registers 18 and 19 to the computer and its memory 20. Controls 21 determine the movement of words individually or in blocks by the enabling or inhibiting signals from the counters 22 and 23, as will appear.

According to an important feature of this invention, a design is provided for the control mechanism that allows the most efficient use of the memory system. The invention allows the buffer memory which is in this case, a core memory, to appear as a wrap-around memory. The controls permit minimum loss of event words and thus provide for maximum capacity of the buffer by initiation of an input data request at some quantitative value of buffer fullness and by continued write in of event words during readout. The controls allow the computer to request the transfer of individual words or the transfer of blocks of words. A block of words may comprise, for example, 32 words in the example here contemplated. The system, further, transmits a control word to the computer whenever the buffer is empty. Still, further, the system is capable of transferring the latest available event word in a block with less than a minimum number of event words in the memory.

Figures 1A, 9:
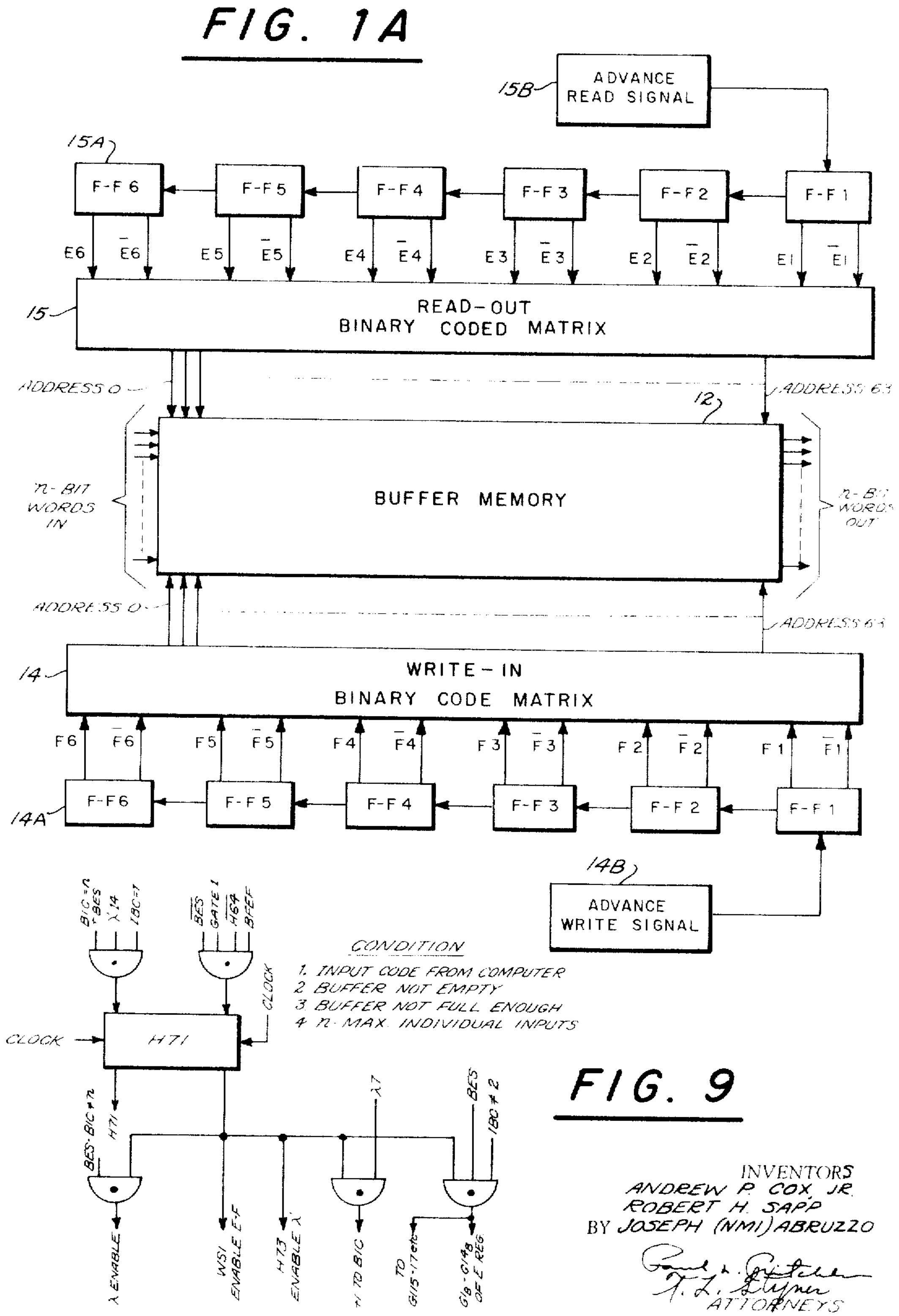
FIG. 1A is a block diagram of one buffer memory write-in and read-out control system.
FIGS. 8, 9 and 10 are diagrams showing, respectively, the logic circuits for treating three conditions that may exist between the buffer and the computer memories.

By way of example, the buffer memory 12 may comprise a magnetic drum of many tracks or storage slots or a grid of magnetic cores. As shown in FIG. 1A, words of $n$ bits are fed into the buffer grid from the left and are read out to the right. The number $n$ may be any positive integer and in one specific successful application the number of bits was 30. The bits may be fed in and out serially or in parallel. The bits of one word are applied to a set of $m$ cores for retaining the word information indefinitely, or until the word is read out. Each word storage or word slot with write-in and read-out controls, is called an "address." The number of addresses may be large or small but preferably is equal to or some multiple of a binary coded decimal number which can be provided by a conventional counter of cascaded bistable flip-flops. That is, the number of addresses, for example, 4, 8, 16, 32, 64 is preferably equal to $2^X$, where X is the number of flip-flop stages. In the example of FIG. 1A, the number of counter stages is 6, and the number of addresses is 64. In FIG. 1A the flip-flop counter stages FF1 to FF6 apply their set and reset voltages to the write-in binary code matrix 14 to apply in succession voltages to 64 address leads indicated at address 0 to address 63. The flip-flop chain is indicated at 14A, the least significant stage being shown at the right, so that count pulses step from right to left. In operation, when a word, with $m$ bits, is available and ready to be written into the buffer memory, a signal pulse is applied to FF1 by the advance write signal generator 14B. Generator 14B functions in response to the word source and in response, further, to information concerning the fullness of the memory and the relative positions of the write-in and read out address. Each signal of the advance write generator applied to flip-flop FF1 advances the address to the next unoccupied word slot.

Words are read out in a similar manner. The readout binary coded matrix 15 applies in succession 64 readout address voltages to the buffer memory. The succession of addresses is controlled by the counter chain of flip-flops 15A with 6 pairs of set-reset voltages E1 to E6. The address signal is advanced one position for each signal received from the advance read signal generator 15B. The advance read signal generator, generally, responds to the computer 20, FIG. 1, or computer memory logic circuitry which calls for the transfer of the next word or next block of words as will appear more fully hereinafter.

Figure 5:
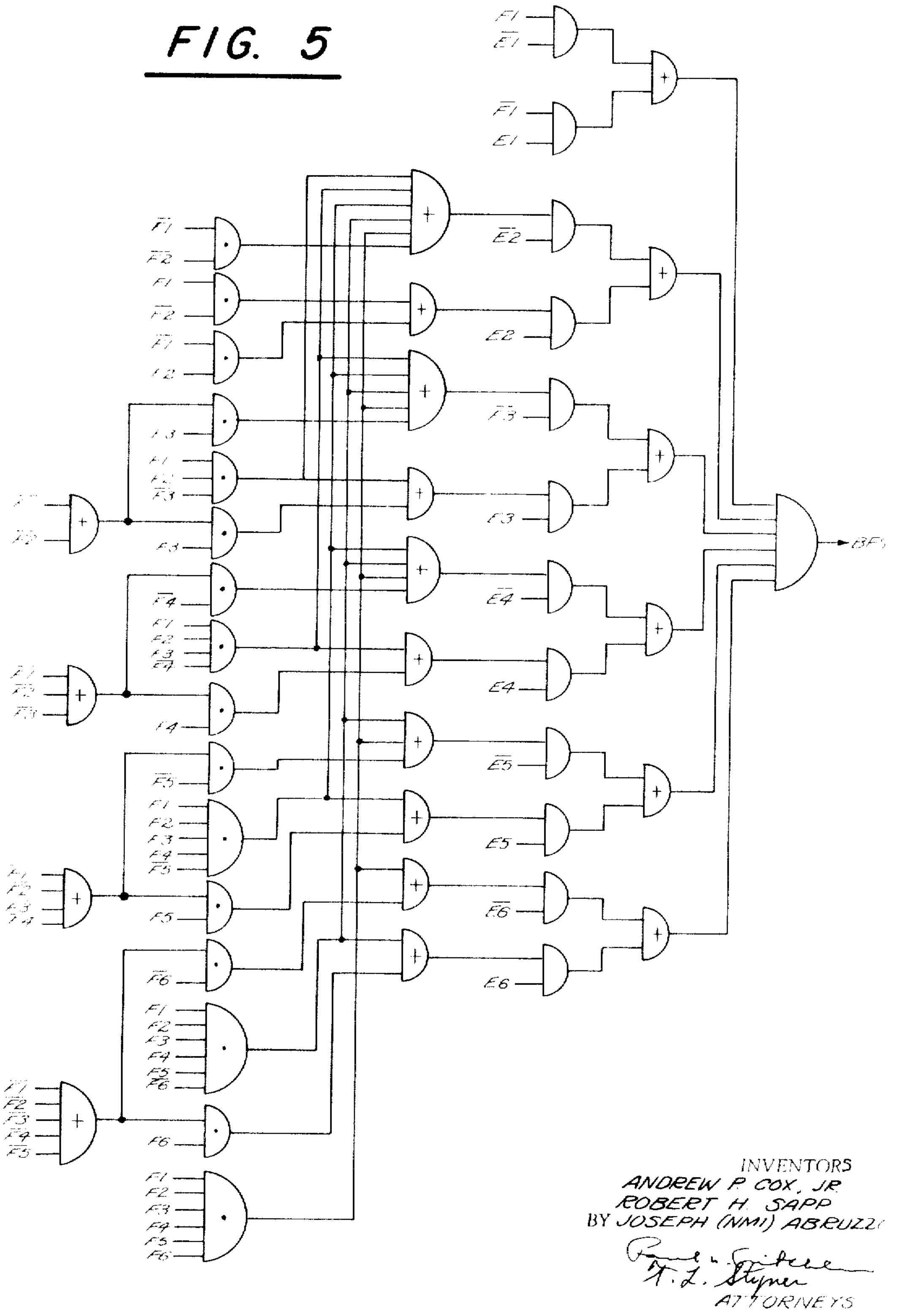
FIG. 5 shows the logic circuits for the generation of the buffer full signal.

One feature of this invention lies in the control signal designs and the novel implementations of these control signals. FIG. 5 shows the design of the logic circuit for generating a buffer full signal. This signal operates in the system to inhibit the write-in of event words from the source 10, 11 whenever memory slots are unavailable and controls the memory so that the write address stays at least one address behind the read address. In FIG. 5, F1–F6 represent the outputs of the write address counter flip-flops, not shown, and E1–E6 represent the outputs of the read address counter flip-flops, not shown. The barred letters represent the reset condition, while the unbarred letters represent the set condition of the flip-flops. 64 addresses are assumed, requiring a 6-stage counter.

Implementation of the buffer full signal follows. The least two significant bits, F1 and F2, of the write address counter are examined and interpreted such that if both are not in the one state (1) the result will be interpreted as being one more than the sum of these least two bits. That is, 00 is interpreted as 01, 01 is interpreted as 10, and 10 is interpreted as 11. Hence, the flip-flops F1 and F2 are so connected as to interpret.

Actual Interpreted $\overline{F2}\cdot\overline{F1}=\overline{F2}\cdot F1$ $\overline{F2}\cdot F1=F2\cdot\overline{F1}$ $F2\cdot\overline{F1}=F2\cdot F1$ which fulfills the rule that the least significant two places are interpreted as one higher when they are dissimilar and are not both one.

The fourth or remaining condition is that the two least significant bits of the write address are alike and each equals one. The results will be interpreted as being equal to 0 and the next more significant bit is examined. This is continued until a bit is found in the chain that does not equal one. This bit is then interpreted as a 1, however, and the succeeding bits toward the most significant are interpreted as being their actual value. For example, address 47 might be read as follows:

| | | | | | | | |
|---|---|---|---|---|---|---|---|
| Write Address **47** | Actual | 1 | 0 | 1 | 1 | 1 | 1 |
| | Interpreted | 1 | 1 | 0 | 0 | 0 | 0 |

Now if all ones exist in the assumed six stages of the write address register, then the write address register is at its maximum and the interpretation must be address 0. That is, address 63+1=address 0.

It follows that the interpreted write address count may be compared for equality with the read address counter so that when equality is found, the write address counter is actually one address below the read address counter. When equality is found a signal results which will inhibit writing into the computer until the condition is alleviated. It is to be noted that no restrictions are placed on read and write counters as far as maximum or minimum binary values are concerned. This is important since it allows the memory to appear to be or function as a wrap-around memory that will write into memory address 63 and then into address 0 without any special implementation. This makes it easy to adapt the core type memory to this system. For purposes of analysis, the 64 possible addresses from a binary coded decimal counter or control circuit may be laid out on the periphery of a circle as in FIG. 2. Write and read heads may be considered to be the equivalent of the read-in and read-out equipment of a magnetic core system and may be thought of as moving step-by-step at clock frequency about the circle of FIG. 2. It is apparent that the write head must keep ahead of the read head else the read head will be reading information out of storage which is not present. It is also apparent that the read head may keep up with the write head to within one address slot, as suggested in FIG. 2, for maximum utilization of the storage system.

Figure 6:
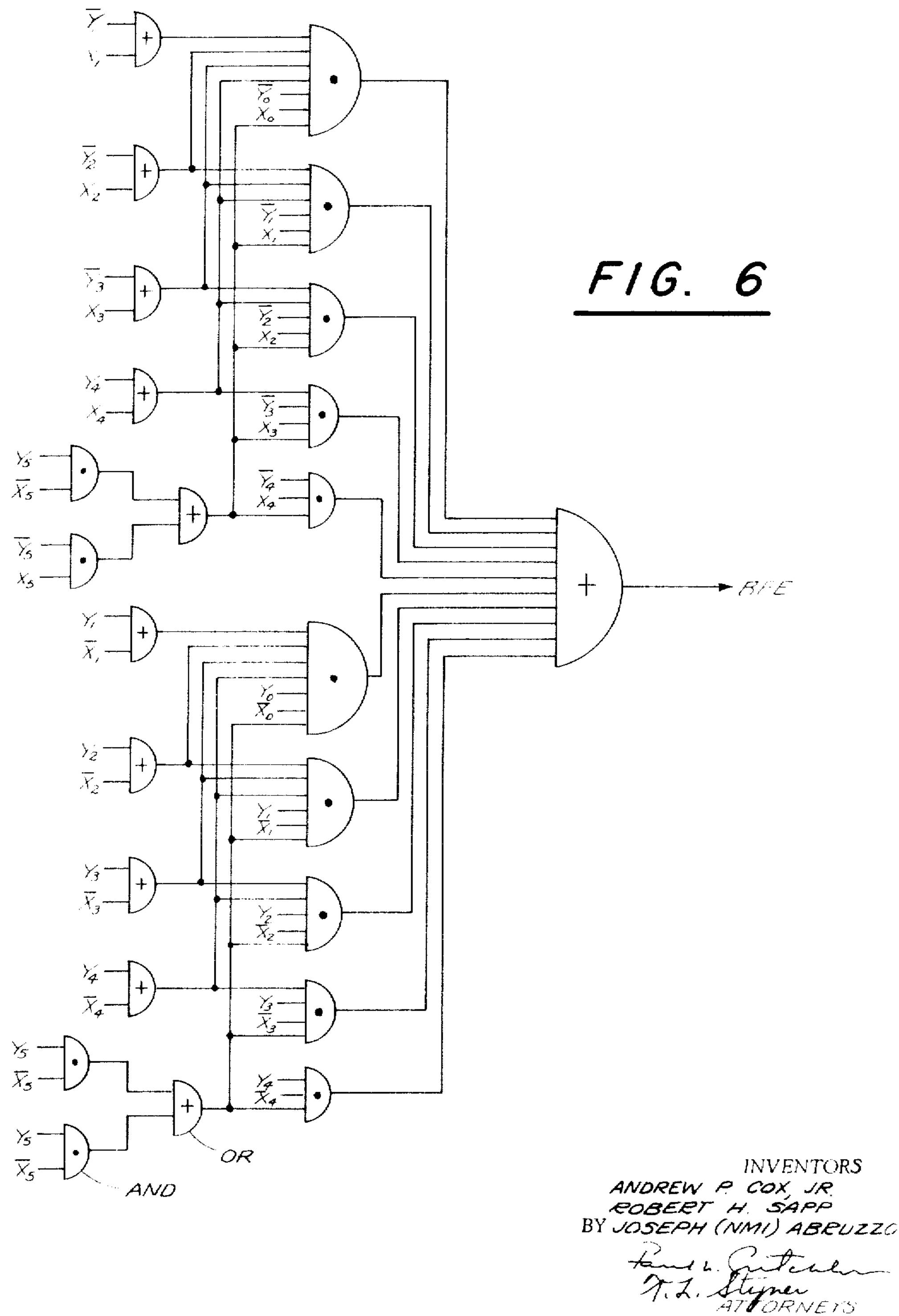
FIG. 6 shows the logic circuit for generating the buffer full enough signal.

Next will be described the buffer full enough signal (BFE), the logic circuitry of which is shown in FIG. 6. The logic for the (BFE) signal is based on a relative comparator. This comparator will produce an output if a binary number A is greater than another binary number B. The Boolean expression for a relative comparator for comparing two binary numbers, A and B, of $m$ bits each, is $$f(A,B)=A_nB_n+A_{n-1}\overline{B}_{n-1}(A_n+\overline{B}_n)+\dots+A_0\overline{B}_0(A_1+\overline{B}_1)(A_2+\overline{B}_2)\dots(A_n+\overline{B}_n)$$

Where there are 64 word slots or addresses in the memory, it is desirable to determine at any instant if there are more than 32 words stored in the buffer memory. To do so, the most significant bit of the write counter, X5, and of the read counter, Y5, are sensed. If they are different, the read and write addresses are certain to be on opposite sides of the 0–32 diagonal of the wrap-around circle of FIG. 3; and if they are alike they are on the same side of the diagonal. Note in the binary-to-decimal table of FIG. 4 that the most significant binary number (column 5) is 0 for all decimal numbers 0 to 31, and is 1 for all decimal numbers 32 to 63. If the most significant bits are the same, that is $$X5=Y5 \text{ or } \overline{X}5=\overline{Y}5$$

or are on the same side of the 0–63 diagonals, and the 5 least significant bits of the write counter are less than the 5 least significant bits of the read counter, that is X4, X3, X2, X1, X0 are less than Y4, Y3, Y2, Y1, Y0, then there must be more than 32 words in the memory. The truth of this proposition is apparent when it is remembered the read address cannot overrun the write address. In FIG. 3 the write address is shown "distance" *b* ahead of the read address, in which case X5 and Y5 are different. In the case of "distance" *a*, X5 and Y5 are the same. Assume now that the write head and the write address counter is distance *b* ahead of the read address counter as is shown in FIG. 3. The proposition may be stated thus. If the most significant bits are different, X5, $\overline{Y}$5 or $\overline{X}$5, Y5, and the five least significant bits of the write counter are greater than five least significant bits of the read counter then there are more than 32 bits in the memory.

A diagram of the logical circuits for generating the buffer full enough signal is shown in FIG. 6. The six complementary pairs of output signals, X0 to X5, of the write control counter are combined with the six complementary output signals Y1 to Y5, of the read counter, as shown in FIG. 6 to fulfill the propositions mentioned and, hence, to generate the BFE signal. The AND and the OR circuits are preferably of conventional design. The BFE signal may then be employed as an enabling control signal to permit read-out from the buffer memory into the computer memory of blocks of 32 words when, of course, the computer calls for more words. The block read-out is considerably faster, as expected, than the word by word read-out with the delays of redundancy check and repetitious requests.

Figures 7, 8, 10:
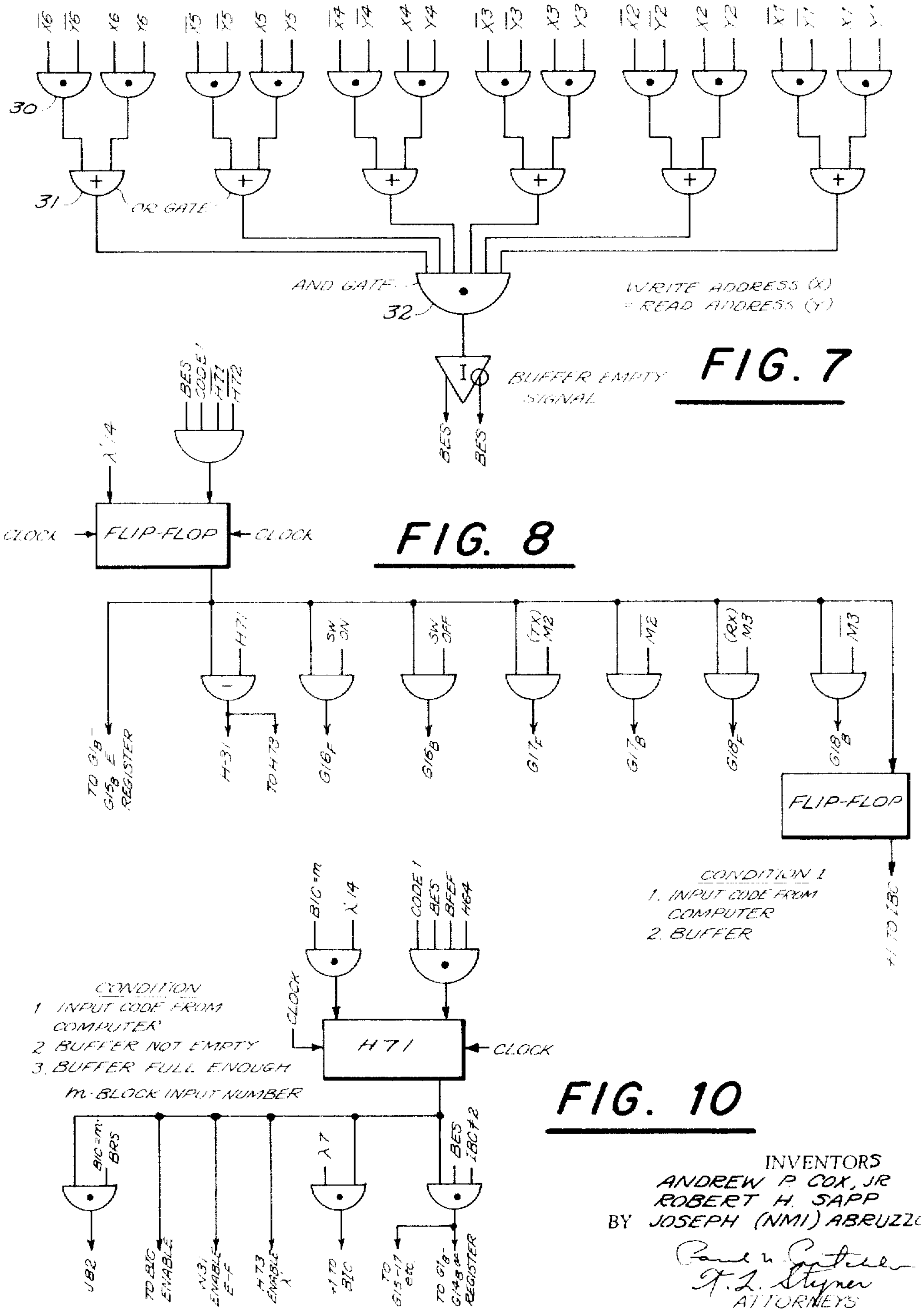
FIG. 7 shows the logic circuit for generating the buffer empty signal.

In FIG. 7 is shown the logic circuitry for generating the buffer empty signal. The six pairs of complementary outputs X of the write head are added in the AND gates 30, to the six pairs of complementary output voltages Y of the read head and are gated through the OR gates 31 to the comparator stage 32 which generates the BES signal when the read address code equals and coincides with the write address code. It is significant to note that the BES signal may occur for any numerical values of the X and Y binary coded decimal signals and that read-in may start at any address. That is, read-in need not necessarily start at the 0 or beginning address of the memory matrix.

It is contemplated that the buffer full enough signal (BFE) will be transmitted to the computer control circuits. This signal informs the computer that the buffer memory is full enough to warrant the computer calling for and reeciving a block of words. In the example mentioned, the block will consist of 32 or more words. Thereafter, the next time the computer initiates a request for data, the block of words is transferred. At all other times, when the BFE signal has not been sent, the computer will call for and receive event words on an individual basis, operate on each word, and then return for the next word.

Since the word-by-word transfer rate is usually slower than the processing rate of events by the source 10 of the write-in words, some maximum number of words can be transferred in the word-by-word mode. In all of these cases, after the maximum has been sent by the word-by-word scheme, or the maximum by the block scheme, or after a buffer empty signal has been received during one of the sub-routines, a control word is transmitted to the computer. In the block input mode, if a buffer empty signal is received before the full block of words has been transmitted to the computer, control words are sent until this number is reached. This control word is used by the computer to know when the last event word of transmisison has occurred.

When the computer control circuits call for the transfer of words from the buffer to the computer memory, three conditions may prevail. These three conditions are examined, respectively, in the circuits of FIGS. 8, 9 and 10, and may be defined as follows:

First, the buffer might be empty, when the computer calls for words. As shown in FIG. 8, the flip-flop H64 is set by the input code. This causes the control word to be set into the E register. The control word has the first 15 bits set to 0 (G1–G15) and the next three bits, G16–G18, describing the status of the system. Flip-flop H64 also enables the E register output to move to the F register and causes the one-shot multivibrator to add one to the block input counter, IBC and enables the counter 2 for stepping words from the buffer to the computer.

Second, when the computer calls for transfer of words the buffer may be not empty and may be not full enough. Implementation for this condition, is shown in FIG. 9. Flip-flop H71 is set by the specified conditions. This causes the λ counter to be enabled, the λ′ counter to be enabled, and the E and F registers to be enabled. After a word is read from the buffer memory, a 1 is added to the block input counter. Whenever the maximum number or buffer empty signal is received the flip-flop H71 is reset and a control word signifying the end of this transmisison is sent.

Third, when the computer calls for buffer words, the buffer may be not empty, yet may be full enough. The logic circuitry for implementing this condition is shown in FIG. 10. The response to these conditions is answered by a block transfer of 32 words, in this specific example considered here. The flip-flop H72 is set and the memory words are fed out into the E register. The λ′ counter continues to transmit words from the buffer to the computer. When and if the buffer is empty the control words are sent. The block input counter is used to determine when the maximum number of event words has been sent. When this occurs the flip-flop H72 is reset.

It is apparent now that according to this invention the buffer full signal generated iin the circuits of FIG. 5 and the buffer full enough signals generated in the circuits of FIG. 6 comprises a combination of unique control signals which allows the most efficient use of the buffer memory. The buffer is operated near its capacity without loss of event words. No restriction is put on the size of the memory to be used and the system is equally applicable to many types of computer memories and computers including those commercially known as the AN/UYK–1 or USQ–20.

What is claimed is:

1. In combination in a control system for feeding asynchronous event words of binary bits into a synchronous computer memory, a buffer memory with write-in means and read-out means coupled, respectively, to the source of event words and to said computer memory, a write address counter for routing successive event words to different addresses in said buffer memory, a read address counter for successively transferring event words out of different addresses of said memory to said computer memory, said write address and read address counters each comprising cascaded bistable binary stages with complementary output terminals, logical circuit means for adding a binary one to the write address counter number and logical circuit means for comparing the augmented write address number with the read address counter number, and circuit means for inhibiting read-out of event words from the buffer memory while the compared numbers are equal to keep the read-out operation always at least one address behind the write-in operation.

2. In combination in a control system for feeding random event words of binary bits into a synchronous computer memory, a buffer memory means with write-in means and read-out means coupled respectively to the source of event words and to said computer memory, a write address counter for routing successive event words to different addresses in said buffer memory means, a read address counter for transferring event words out of said memory to said computer memory, said write address and read address counters each comprising cascaded bistable binary stages with output terminals for binary coded members, and a relative comparator logic circuit comprising means responsive to the coded numbers of said counters for generating a distinctive buffer-full-enough signal when the most significant binary bit of the write counter and of the read counter are the same and when the least significant binary bits of the write counter are less than the least significant bits of the read counter.

3. In combination in a control system for feeding event words of $n$ binary bits into a synchronous computer memory, a buffer memory means with write-in means and read-out means coupled respectively to the source of event words and to said computer memory, a write address counter for routing successive event words to successive word addresses in said buffer memory means, a read address counter for transferring event words out of said memory to said computer memory, said write address and read address counters each comprising cascaded bistable binary stages with output terminals for decimal coded binary numbers, and a relative comparator logic circuit comprising means responsive to the coded numbers of said counter for generating a distinctive buffer-full-enough signal when the most significant bits of said numbers are different and when the five least significant bits of the write counter number are greater than the five least significant bits of the read counter number.

4. The combination defined in claim 3 further comprising, logical circuit means responsive to said buffer-full-enough signal for transferring a block of event words from said buffer memory to said computer memory.

5. In combination in a buffer storage system, a wrap-around memory matrix including a plurality of address slots for storing multiple bit words, a write-in address counter coupled to said matrix for routing successive words to different addresses in said matrix, a read-out address counter coupled to said matrix for successively sensing and reading out the contents of said address slots, said write-in and read-out counters each comprising a plurality of cascaded binary stages to code in binary numbers each of said plurality of address slots, means for comparing the binary number of one counter with the binary number of the other counter, and logic circuit means responsive to said comparing means and operable upon said matrix for selectively enabling and inhibiting write-in and read-out.

6. A buffer storage system for coupling an asynchronous source of binary words into a synchronous utilization means comprising;

a buffer memory matrix with a predetermined number of word storage slots and having a write-in gate;

a write-in counter having a first series of cascaded flip-flops, said flip-flops being connected in tandem so that the output terminals of said flip-flops contains binary coded members representative of the number of counts fed into one end of said series;

an advance write signal source coupled to said one end of said cascaded flip-flops for successively applying triggering pulses to said write-in counter;

a read-out counter having a second series of cascaded flip-flops adapted to produce binary encoded numbers on the output terminals of the flip-flops in response to pulses applied at one end of the second cascaded series;

an advance read signal source said source being coupled to one end of said read-out counter;

logic circuit means for comparing the binary encoded numbers at the terminals of the flip-flops of the read-out counter with the binary encoded numbers of the terminals of the flip-flops of the write-in counter for generating an inhibiting signal when the numerical difference in the compared numbers is a predetermined value;

means responsive to said inhibiting signal for disabling said write-in gate to prevent incoming signals from said source from being added to any of said storage slots.

7. The system defined in claim 6 further comprising means responsive to said inhibiting signal for disabling said read-out gate to prevent stored signals from being read out to said computer.

8. The system defined in claim 6 further comprising;

means responsive to the presence or absence of binary words in each of said storage slots for gating the signals of said advance signal sources to the respective counters.

No references cited.

ROBERT C. BAILEY, *Primary Examiner.*

M. LISS, R. ZACHE, *Assistant Examiners.*